United States Patent
Niemela et al.

(10) Patent No.: US 7,104,478 B2
(45) Date of Patent: Sep. 12, 2006

(54) MATERIAL SPREADING DEVICE

(75) Inventors: Cal G Niemela, Chassell, MI (US); Philip J Quenzi, Atlantic Mine, MI (US)

(73) Assignee: Rockit Corporation, Calumet, MI (US)

( * ) Notice: Subject to any disclaimer, the term of this patent is extended or adjusted under 35 U.S.C. 154(b) by 154 days.

(21) Appl. No.: 10/855,207

(22) Filed: May 27, 2004

(65) Prior Publication Data

US 2004/0256502 A1   Dec. 23, 2004

Related U.S. Application Data

(60) Provisional application No. 60/475,543, filed on Jun. 3, 2003.

(51) Int. Cl.
 *A01C 19/00* (2006.01)

(52) U.S. Cl. ............ 239/672; 239/656; 239/661; 239/663; 239/675; 239/677; 239/667; 239/669; 239/668; 239/681; 239/684; 239/687; 241/260.1; 241/101.74; 241/101.741; 414/411; 414/505

(58) Field of Classification Search ............ 239/656, 239/661, 663, 672, 675, 677, 667, 668, 669, 239/681, 684, 687; 241/260.1, 101.74, 101.741; 414/411, 505
See application file for complete search history.

(56) References Cited

U.S. PATENT DOCUMENTS

| 507,122 | A | | 10/1893 | Harrington | |
|---|---|---|---|---|---|
| 788,648 | A | | 5/1905 | Kinney | |
| 862,597 | A | | 8/1907 | Wilson | |
| 2,514,843 | A | | 7/1950 | Clement | |
| 3,656,638 | A | | 4/1972 | Hutton et al. ............... | 414/518 |
| 3,722,717 | A | | 3/1973 | Stryczek | |
| 3,754,711 | A | * | 8/1973 | Gledhill ...................... | 239/674 |
| 3,815,764 | A | | 6/1974 | Gilfillan et al. | |
| 4,002,272 | A | * | 1/1977 | Crawford et al. ........... | 222/392 |
| 4,162,735 | A | | 7/1979 | Lewis | |
| 4,394,976 | A | * | 7/1983 | Rae ............................ | 239/679 |
| 4,405,089 | A | * | 9/1983 | Taylor ........................ | 239/656 |
| 4,842,471 | A | | 6/1989 | Hodgetts | |
| 5,281,074 | A | | 1/1994 | Mashuda | |
| 5,314,290 | A | | 5/1994 | Lutz et al. | |
| 5,927,617 | A | * | 7/1999 | Musso et al. ............... | 239/657 |
| 5,988,534 | A | * | 11/1999 | Kost et al. ................... | 239/650 |
| 6,056,497 | A | | 5/2000 | Holz | |
| 6,131,830 | A | | 10/2000 | Jones ......................... | 239/654 |
| 6,173,904 | B1 | * | 1/2001 | Doherty et al. ................ | 239/1 |
| 6,209,808 | B1 | * | 4/2001 | Anderson .................... | 239/682 |

(Continued)

*Primary Examiner*—David A. Scherbel
*Assistant Examiner*—Trevor McGraw
(74) *Attorney, Agent, or Firm*—Van Dyke, Gardner, Linn & Burkhart, LLP

(57) ABSTRACT

A material spreading device for spreading material over a targeted area includes a receiving portion for receiving a plurality of bags of material, a hopper assembly and a material moving device. The material spreading device is configured for use on a vehicle. The hopper assembly has a bag holding portion and a material dispensing bin. The bag holding portion receives at least some of the bags and retains the bags at or near the material dispensing bin. The hopper assembly includes at least one opening device for opening the bags such that material within the opened bags is deposited into the material dispensing bin. The material dispensing bin is operable to dispense or broadcast the material over the targeted area. The material moving device is operable to move the bags of material along the receiving portion and toward the hopper assembly.

45 Claims, 12 Drawing Sheets

U.S. PATENT DOCUMENTS

| | | |
|---|---|---|
| 6,422,490 B1 * | 7/2002 | Truan et al. ................. 239/659 |
| 6,446,879 B1 * | 9/2002 | Kime ............................ 239/7 |
| 6,698,997 B1 | 3/2004 | Arne et al. |
| 6,719,226 B1 | 4/2004 | Rajewski ..................... 241/30 |
| 6,817,551 B1 * | 11/2004 | Williams et al. ............ 239/656 |
| 6,893,340 B1 * | 5/2005 | Schmidt et al. ............. 460/111 |
| 6,938,829 B1 | 9/2005 | Doherty et al. ................. 239/1 |
| 6,945,385 B1 * | 9/2005 | Ackerman et al. .......... 198/692 |

* cited by examiner

MATERIAL SPREADING DEVICE

CROSS REFERENCE TO RELATED APPLICATION

The present application claims benefit of U.S. provisional application Ser. No. 60/475,543, filed Jun. 3, 2003, which is hereby incorporated herein by reference in its entirety.

FIELD OF THE INVENTION

The present invention relates generally to material spreading devices and, more particularly, to salt spreading devices which may be used with a pickup truck or the like. The present invention may be suitable for spreading other materials, such as dirt, sand, fertilizer, gravel, mulch, soil, seeds or the like.

BACKGROUND OF THE INVENTION

During cold or winter-like conditions, commercial parking lots and roadways typically have deicing salt applied to their surfaces by contractors with tailgate and vee box salt spreaders. Typically, certain aspects of handling and spreading salt with conventional vee box and tailgate spreaders are inefficient and unsafe, as well as impractical for some operators.

At approximately an eight to ten cubic foot maximum capacity, conventional tailgate spreaders typically do not hold enough material to cover a desired or targeted area, and therefore require the operator to refill the hopper frequently during the salting operation. This refilling process is often performed in the darkness of early morning or late night, and often during inclement weather. While stopping to refill the hopper is time consuming, it also may be a hazard to the operator to climb in and out of the truck bed under these conditions to perform this task. Reports of injuries sustained by this activity are not uncommon.

Many contractors, lacking a facility to store bulk salt and/or a loading method, would likely prefer to stay in the truck cab and increase their operating efficiency by having a larger capacity tailgate spreader. However, due to the over-slung position of conventional tailgate spreaders, it is typically impractical if not impossible to significantly increase the volume or weight capacity of such tailgate spreaders.

Vee box spreaders on the other hand typically have a much larger capacity, thereby increasing efficiency and avoiding the requirement that the operator make frequent stops to refill or service the equipment, thus reducing the exposure to injury. However, while tailgate spreaders utilize bagged salt, vee box spreaders are designed to utilize loose bulk material, requiring both a storage area and a means of loading the salt into the spreader box. Also, such vee box spreaders extend substantially upward above the truck bed and restrict or even substantially block the rearward view of the driver of the vehicle.

Therefore, there is a need in the art for a salt spreader device or assembly which overcomes the shortcomings of the prior art.

SUMMARY OF THE INVENTION

The present invention provides an alternative to the small tailgate spreaders for those contractors who desire to increase spreading efficiency but may not have the means to handle bulk material. The salt spreader of the present invention is positionable within a pickup truck bed and may dispense and spread salt from bags of salt placed in the bed of the pickup truck. The salt spreader may spread other material, such as dirt, sand, fertilizer, gravel, mulch, soil, seeds or the like, and may spread such material provided in bags or in bulk loads.

According to an aspect of the present invention, a material spreading device or assembly for spreading material over a targeted area comprises a receiving portion for receiving a plurality of bags of material, a hopper assembly and a material moving device. The material spreading device is adaptable for use on a vehicle. The material moving device is operable to move the bags of material along the receiving portion and toward the hopper assembly. The hopper assembly includes a bag holding portion which is configured to receive at least some of the bags and to retain the bags at or near a material dispensing bin of the hopper assembly. The hopper assembly has at least one opening device for opening the bags retained at the bag holding portion such that material within the bags is deposited into the material dispensing bin. The material dispensing bin is operable to dispense or broadcast the material over the targeted area.

The receiving portion of the material spreading device may be configured to fit within a pickup truck bed, with the hopper assembly being mountable at a rear end of the pickup truck bed. The hopper may be pivotally mounted or removably mounted at the rear end of the receiving portion or of the pickup truck, so that the hopper assembly may be moved or pivoted to an open position or removed to facilitate loading of the receiving portion by a person on the ground outside of the pickup truck bed. The receiving portion may be configured to receive approximately 44 fifty pound-bags of salt, which translates to approximately 33 cubic feet or 2200 lbs. of bagged salt. The receiving portion may be configured to receive bulk material, whereby the material moving device may be operable to move the bulk material toward the hopper assembly.

The material moving device may comprise a movable bulkhead or push plate which is movable to push the bags of material toward the hopper assembly. The movable bulkhead may be movable via a rotatably driven sprocket engaging a track extending generally along the receiving portion. The material moving device may include a conveyor along a lower portion of the receiving portion for conveying the bags of material toward the hopper assembly. The material moving device may be operable in response to a limit sensor detecting a threshold low level of material in the dispensing bin.

The bag holding portion of the hopper assembly may include a plurality of forwardly extending members for piercing the bags and retaining the bags at or near the material dispensing bin. The hopper assembly may include a spinner disc which is rotatably drivable to broadcast material dispensed from the material dispensing bin. The hopper assembly may also include a material discharging device operable to move material within the material dispensing bin toward a discharge opening in the material dispensing bin.

According to another aspect of the present invention, a method for spreading material over a targeted area includes providing a material spreading device adapted for use on a vehicle. The material spreading device includes a hopper assembly having a bag holding portion and a material dispensing bin. The bag holding portion is configured to receive bags of material and to retain the bags at or near the material dispensing bin. The hopper assembly is mounted at a rear end of a pickup truck bed. Bags of material are loaded into a receiving portion, which is positioned at least partially within the pickup truck bed. The bags of material are moved along the receiving portion and toward the bag holding portion via a moving device operable to move the bags of material until at least some of the bags are at the bag holding portion. The bags are held at the bag holding portion, and are opened, such that material within the held bags is deposited into the material dispensing bin. The material is dispensed over the targeted area.

The bags may be moved along the receiving portion via a movable bulkhead that may move or push the bags toward the bag holding portion. The bags may be held at the bag holding portion via a plurality of forwardly extending members that may pierce the bags to retain the bags at the bag holding portion while the bags are opened and emptied into the material dispensing bin.

According to another aspect of the present invention, a material spreading device for spreading material over a targeted area includes a receiving portion for receiving material, a hopper assembly, and a material moving device. The material spreading device is adapted for use on a vehicle, and the receiving portion is configured to fit within a pickup truck bed, while the hopper assembly is mountable at a rear end of the pickup truck bed. The hopper assembly includes a material dispensing bin that is operable to dispense or broadcast the material over the targeted area. The material moving device is operable to move the material along the receiving portion and toward and into the hopper assembly. The material moving device includes a movable bulkhead which is movable to push the material toward the hopper assembly. Material thus may be loaded into the receiving portion and may be moved along the receiving portion into the material dispensing bin, where the material may then be dispensed and spread over the targeted area as the vehicle is driven or moved over the targeted area.

Therefore, the present invention provides a material spreading device or assembly which is configured to fit within the bed of a pickup and which may receive and spread a substantial amount of salt or other material over a targeted area. The receiving portion may be filled with bags or containers of material, such as salt, sand, gravel, fertilizer, seed or the like. The bags may be moved into a hopper, where the bags are opened at their bottoms to dispense the material into a material dispensing bin of the hopper, which in turn, may dispense the material onto the targeted area. The receiving portion may be loaded from the rear of the pickup truck, such that the operator does not have to climb into the pickup truck bed to load the material or bags of material. The present invention thus provides a material spreading device or assembly which is capable of holding and spreading a substantial amount of material, and which is easier and safer to load than conventional spreaders.

These and other objects, advantages, purposes and features of the present invention will become apparent upon review of the following specification in conjunction with the drawings.

DESCRIPTION OF THE PREFERRED EMBODIMENTS

Figure 4:
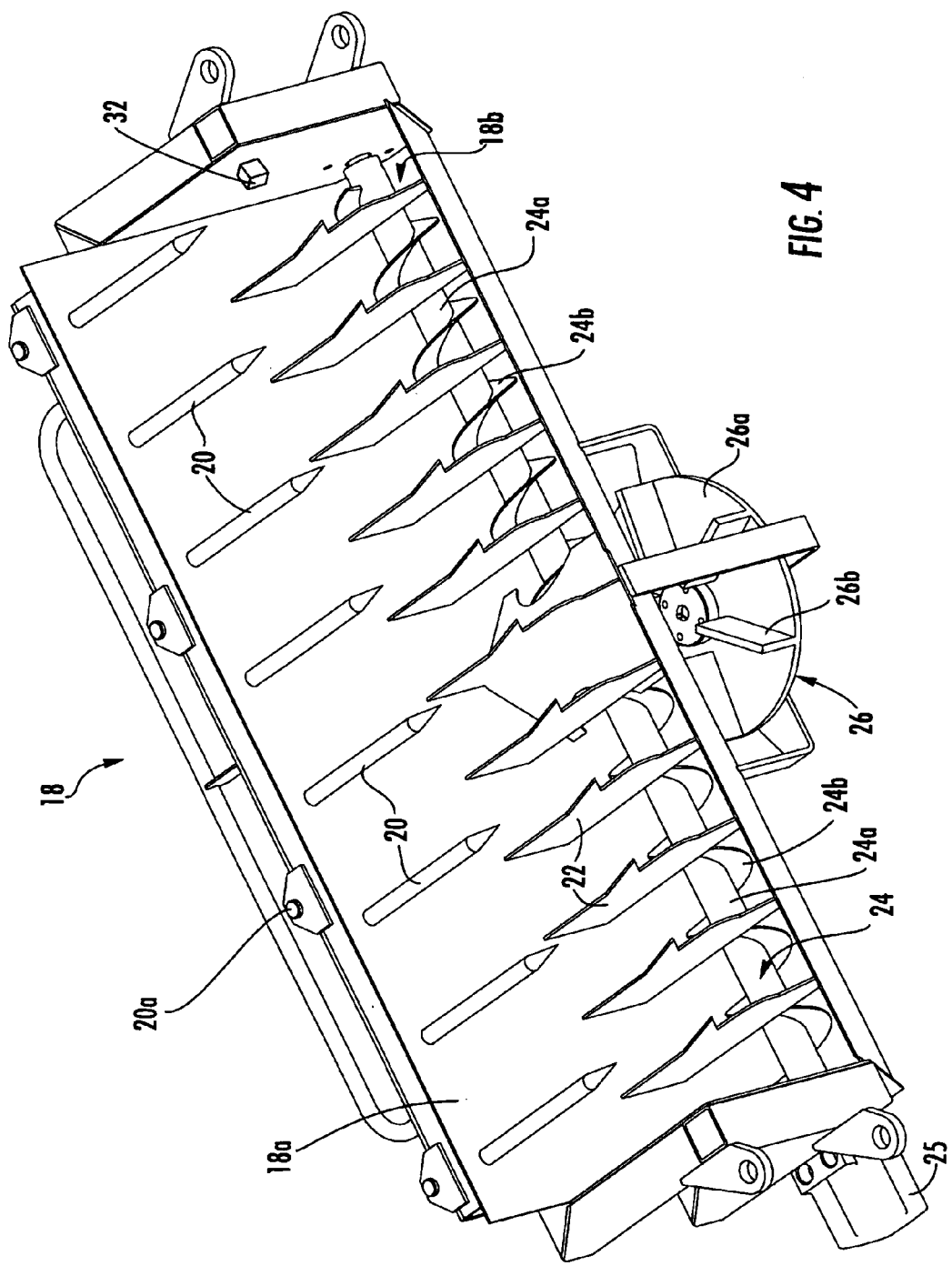
FIG. 4 is a perspective view of an upper and forward portion of the hopper assembly of the material spreading assembly of the present invention.
Figure 5:
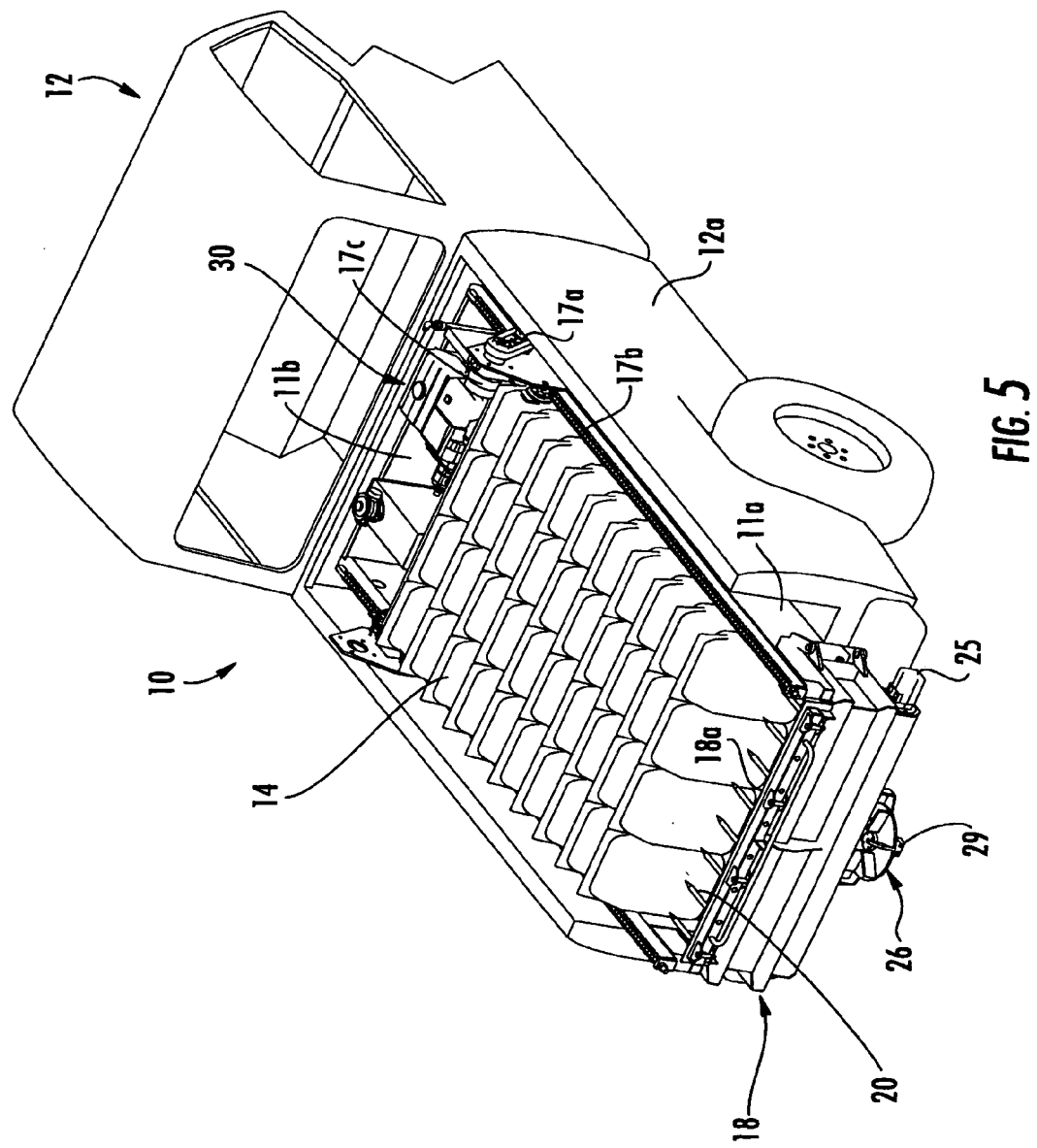
FIG. 5 is another perspective view similar to FIG. 2, with the material spreading assembly being substantially filled with bags of material.
Figure 6:
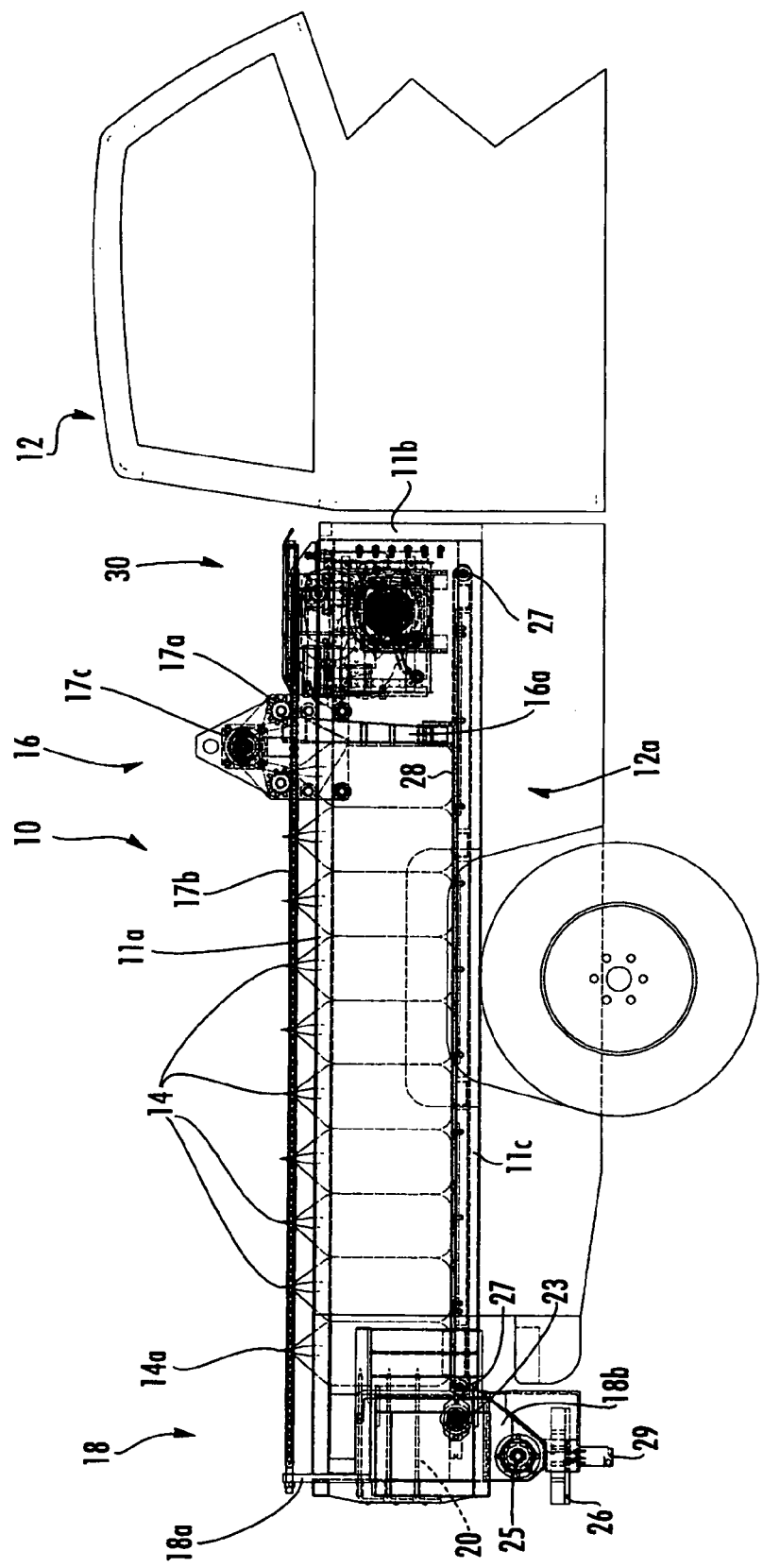
FIG. 6 is a side elevation of the vehicle of FIG. 5.
Figure 7:
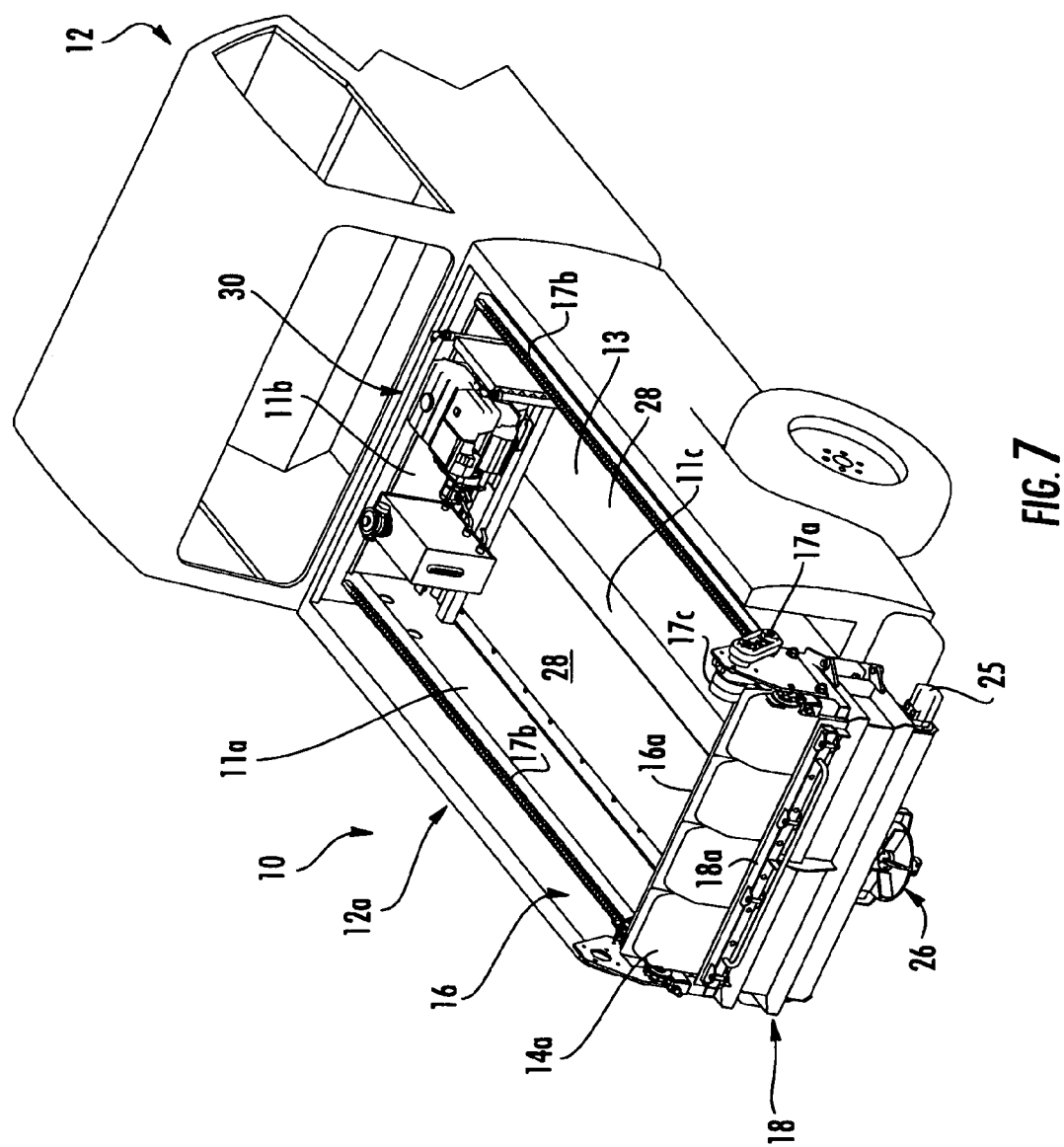
FIG. 7 is a perspective view similar to FIG. 5, with the material spreading assembly being substantially emptied.

Referring now to the drawings and the illustrative embodiments depicted therein, a material spreading device or assembly or salt spreader assembly 10 is positionable within a bed portion 12a of a vehicle 12 and is operable to dispense and spread salt or other material therefrom (FIGS. 1, 2 and 5–7). Salt spreader assembly 10 includes a material receiving portion or magazine 13, which is positionable in the bed portion 12a and is configured to receive and hold containers or bags 14 of salt or other material (FIGS. 5–7). The term "bags of material", as used herein, refers to bags or containers that contain material therein and that may be placed in the receiving portion unopened and with the bag intact and holding the material within the initially intact bag. Salt spreader assembly 10 is operable to empty the material from the bags and to spread the material over the targeted area. Salt spreader assembly 10 includes a material moving or pushing device 16, which is movable along the receiving portion 13 to push the bags 14 toward a hopper assembly 18 positioned at the rear of the receiving portion 13. Hopper assembly 18 includes a plurality of bag holders or spikes or spears or members 20 for piercing the rear most row of bags 14a (FIGS. 6 and 7) at the hopper and for supporting and retaining the pierced bags while bag openers 22, such as knives or blades or the like, slice, cut or tear or otherwise open the bags at the bottom portion of the bags to allow the material within the bags to be deposited into the hopper dispensing bin, as discussed below. The hopper assembly 18 may further include a hopper auger device or dispensing device 24 (FIG. 4) for moving the material to a discharge opening or hole in the hopper bin, whereby the material may be spread or broadcast by a spinner disc 26 or the like, as discussed below.

Figure 1:
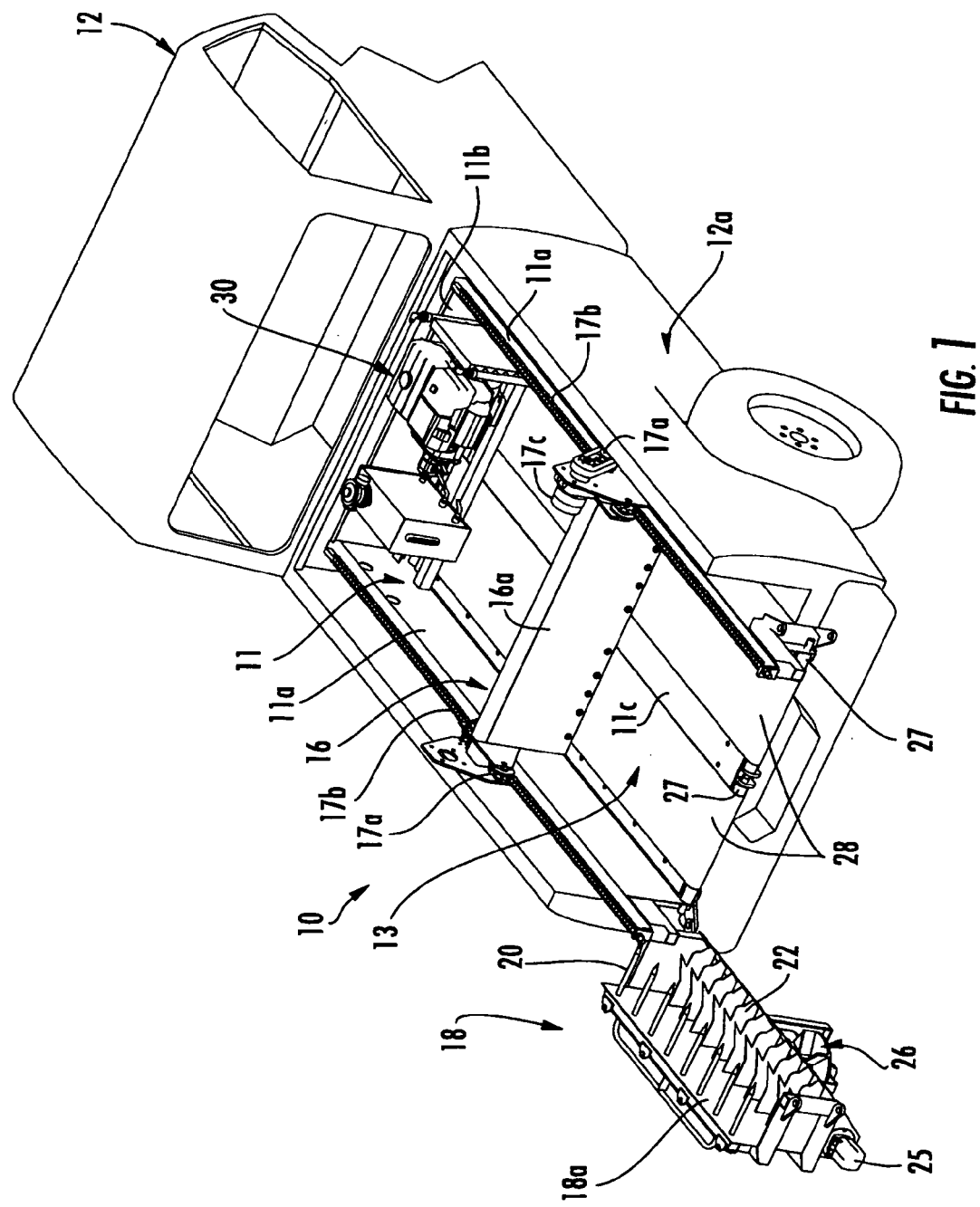
FIG. 1 is an upper perspective view of a rear portion of a vehicle having a material spreading assembly in accordance with the present invention positioned thereon.

As best shown in FIG. 1, salt spreader assembly 10 may comprise a frame portion 11, which includes a pair of side frames 11a, a front frame or wall portion 11b and a base or floor portion 11c. The frame portion 11 defines the receiving portion or area 13 and is configured to receive the material or bags of material to be spread or broadcast. The frame portion 11 of salt spreader assembly 10 may be sized to fit within the pickup truck bed (or may comprise the side walls of a pickup truck bed), such that the salt spreader assembly may be implemented on a standard pickup truck or the like with minimal modifications being necessary to the pickup truck. For example, in the illustrated embodiment, the salt spreader assembly is approximately 48 inches wide and 120 inches long, such that it may fit within a standard pickup truck bed. The frame portion 11 may be constructed of tubular steel or other durable, rigid and strong material to support the weight of the bags when loaded. A power source or power means 30, such as a gas powered engine and hydraulic pump, may be provided at a forward end of frame portion 11 to provide pressurized fluid to one or more hydraulic motors which are operable to drive or control various components of salt spreader assembly 10, as discussed below.

Material moving or pushing device 16 comprises a generally vertical wall portion or bulkhead or push plate 16a, which is movable along the length of the receiving portion 13 to push the bags of salt or other material toward the rear of the vehicle and thus toward the hopper assembly 18. In the illustrated embodiment, the bulkhead 16a extends at least substantially across the receiving portion 13 and between side walls or frames 11a. Bulkhead 16a may be movable relative to sidewalls 11a via at least one rotatably driven gear member 17a which may rotatably and drivably engage a chain or track or the like 17b extending along one or more of the sidewalls 11a of the receiving portion 13. As shown in FIGS. 1, 2, 5 and 7, a chain or track 17b may be positioned along each sidewall 11a, with sprocket wheels 17a rotatably engaging the tracks 17b to guide and/or drive the bulkhead 16a along sidewalls 11a.

Optionally, the base frame portion 11c of frame portion 11 may include a plurality of rollers 27 extending thereacross for rotatably driving and/or supporting one or more conveyor belts 28. Bulkhead 16a may also be connected to or attached to the conveyor belts 28, which extend along and at least partially define the floor of the receiving portion 13. As bulkhead 16a is moved or driven and/or as the conveyor belts 28 are moved or driven toward the rear of the receiving portion 13, the bags 14 of salt or other material are also moved toward the rear of the receiving portion 13 and toward and into engagement with the hopper assembly 18, as discussed below. The drivable gear member 17a may be rotatably driven by a hydraulic motor 17c positioned at material moving assembly 16 and/or the conveyor 28 may be driven by a hydraulic motor (not shown). The motor or motors may be powered or driven via the gas powered engine 30 and pump or power means.

Figure 2:
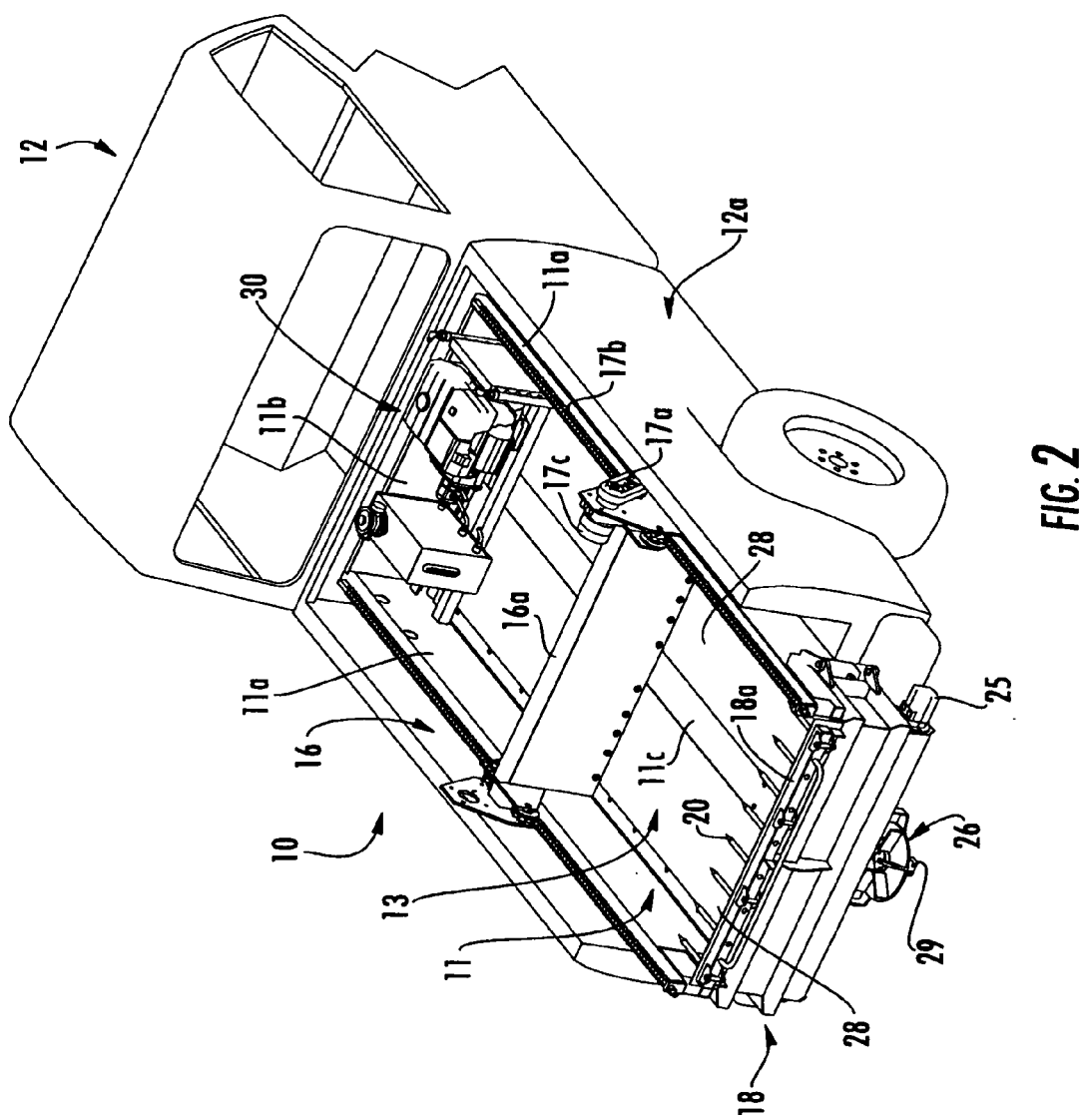
FIG. 2 is another perspective view similar to FIG. 1, with the hopper/tailgate in the closed position.

Hopper assembly 18 may be mounted to the rear end of side frames 11a at the rear of the bed 12a of the vehicle 12, such as via a hinge type mounting arrangement or the like, in order to allow the hopper assembly 18 to be opened sidewardly (as shown in FIG. 1) to ease loading of the receiving portion 13 with the bags of salt or other material (although other means for mounting or removably mounting or movably mounting the hopper assembly to the vehicle may be implemented without affecting the scope of the present invention). When the receiving portion 13 has been filled to a desired amount, the hopper assembly 18 may be pivoted or swung to the closed position (as shown in FIG. 2) and latched or pinned in the closed position.

Figure 3:
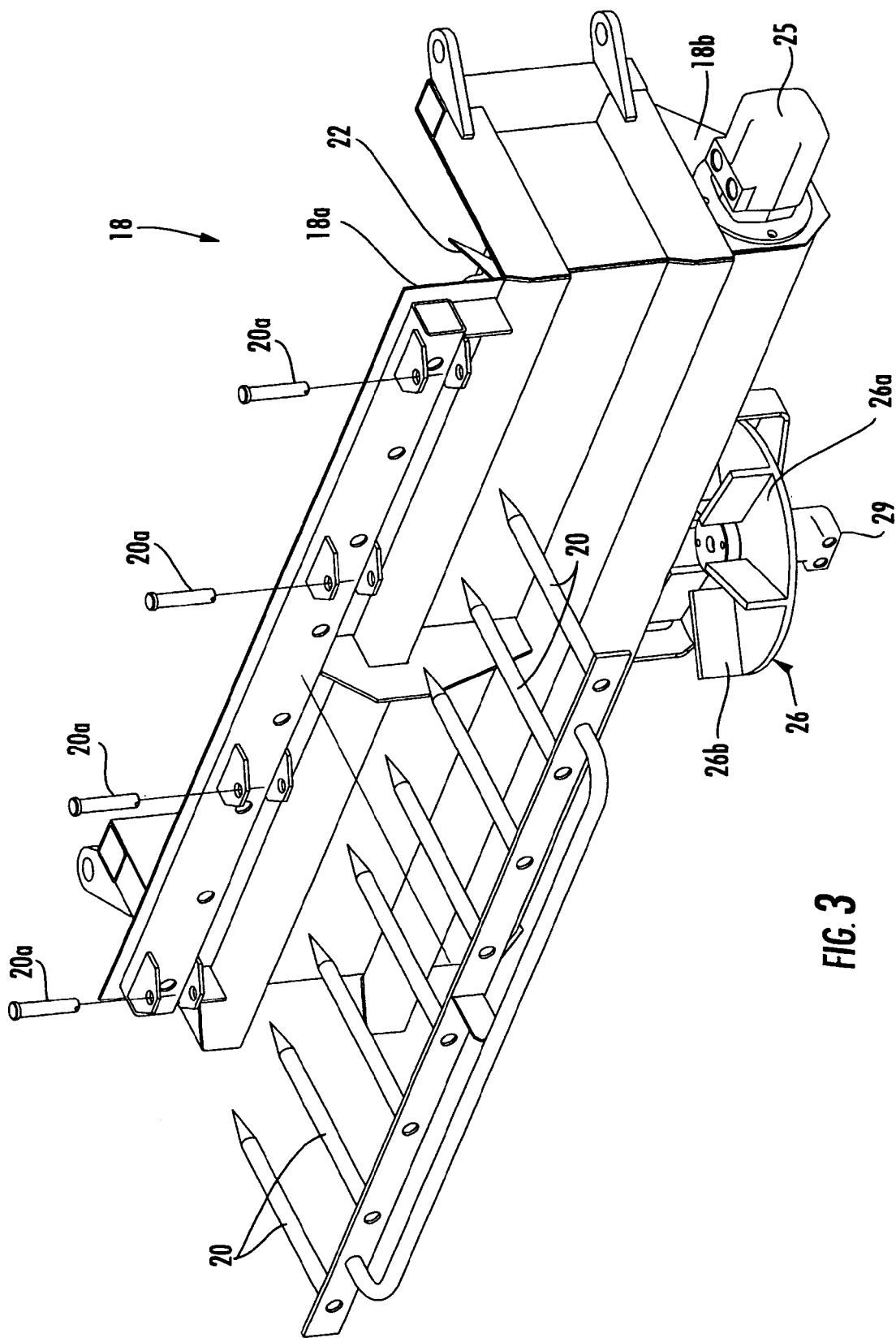
FIG. 3 is an exploded perspective view of the hopper assembly of the material spreading assembly of the present invention.

As can be seen in FIGS. 1–6, hopper assembly 18 includes a plurality of bag holders or spikes or spears or forwardly extending rods or members 20, which extend forwardly from a rear wall 18a of hopper assembly 18 and which may have a substantially sharpened or pointed end. The spikes 20 function to engage and pierce the rearward row of bags 14a of salt or other material as the bags 14 are moved rearwardly toward and into hopper assembly 18 via movement of bulkhead 16a and/or conveyor belts 28. As shown in FIG. 3, the bag holders or spikes or spears 20 may be removably attached or mounted to the rearwall 18a of hopper assembly 18 via a plurality of mounting pins 20a.

Hopper assembly 18 also includes a plurality of blades or knives or slicing members or bag opening devices 22 (FIGS. 1, 3 and 4), which are positioned generally beneath the bag holders or spikes or spears 20 and along a lower portion of hopper assembly 18. The opening devices 24 function to engage and slice or rip or cut or otherwise open the bottom portions of the bags 14 as the bags are pushed toward and into the hopper assembly 18 and onto the bag holders 20. The opening devices 22 may comprise generally fixed pointed or jagged blades extending upward and forwardly with respect to the hopper and to the vehicle to engage and cut or rip the bottoms of the bags as the bags are moved into the hopper assembly and generally over the cutting devices and the dispensing bin.

Optionally, the opening devices may be movable blades or cutting devices, and may be driven to oscillate or move or vibrate to enhance the cutting or opening of the bags with the opening devices, without affecting the scope of the present invention. For example, and with reference to FIGS. 8–11, the opening devices or blades may be generally circular blades 22', which may be rotatably driven to cut or saw through the bottoms of the bags, as discussed below. Optionally, it is envisioned that the opening device or blades may be any other cutting means or blade or device which may function to rip, cut, tear, slice or otherwise open the bottoms of the bags 14 as the bags are moved into the hopper assembly via the material moving assembly, without affecting the scope of the present invention. The bag opening devices thus may open a lower end or portion of the bags, while the bags are suspended by the bag holders or spikes, such that the material or contents of the bags may readily dispense from the suspended bags into a material collecting portion of the hopper assembly 18.

Hopper assembly 18 includes the collecting portion or region or material dispensing chamber or bin 18b at a lower portion of the hopper assembly 18 for collecting the salt or other material as it is deposited or emptied from the held or suspended bags 14. The hopper assembly 18 may include an auger device or other material moving or dispensing device 24 positioned along dispensing bin 18b and operable to move or guide the material within the dispensing bin toward the center portion of the dispensing bin, where the dispensing bin may include a drain opening or discharge opening or hole for the salt or other material to discharge therethrough. The auger assembly 24 may comprise an elongated shaft 24a with opposite directed flighting 24b, such that rotation of the shaft in one direction will convey the material at either side of the discharge opening toward the generally centered discharge opening. A drive motor 25 may be provided to rotatably drive the outer shaft 24a in the desired direction to move the material toward the center of the hopper assembly 18. The drive motor 25 may comprise a hydraulic motor which is operable in response to pressurized fluid from the power source or engine 30 and pump.

Hopper assembly 18 further includes a spinner disc or broadcasting disc 26 (or other means for spreading or broadcasting the material over the targeted area), which may be positioned at a generally central region of the hopper assembly 18 and generally below the discharge opening in the dispensing bin 18b of hopper assembly 18. Spinner disc 26 comprises a generally circular disc 26a with a plurality of upward extending flanges or members 26b, and functions to rotate or spin and throw or discharge or broadcast the material dispensed from the dispensing bin 18*b* in all directions as the material is dispensed from the dispensing bin 18*b* of hopper assembly 18. Spinner disc 26 may be rotatably driven at a desired speed by a hydraulic motor 29 (FIG. 6), which may in turn be powered or driven by power source 30.

Figure 8:
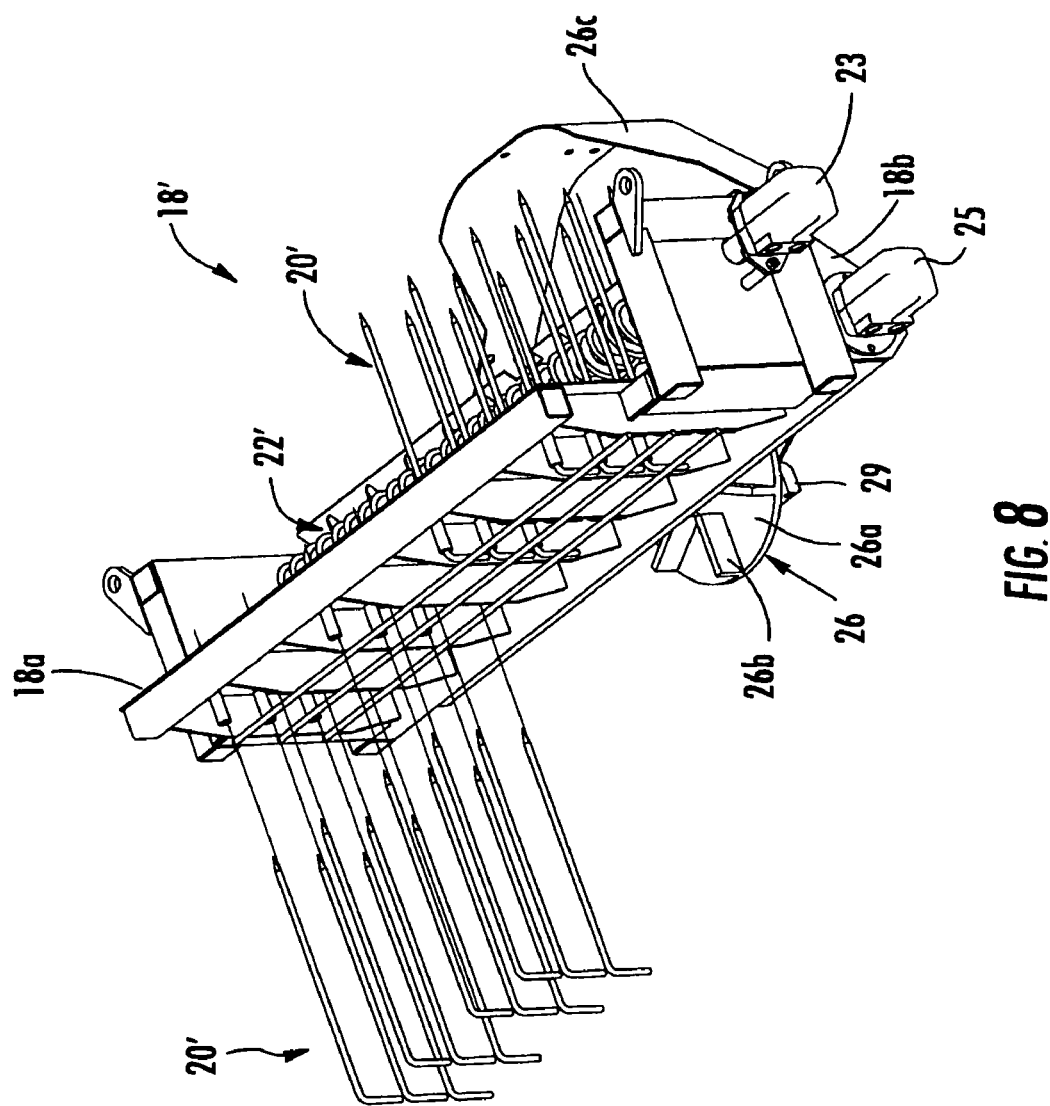
FIG. 8 is a perspective view of another hopper assembly in accordance with the present invention.
Figure 9:
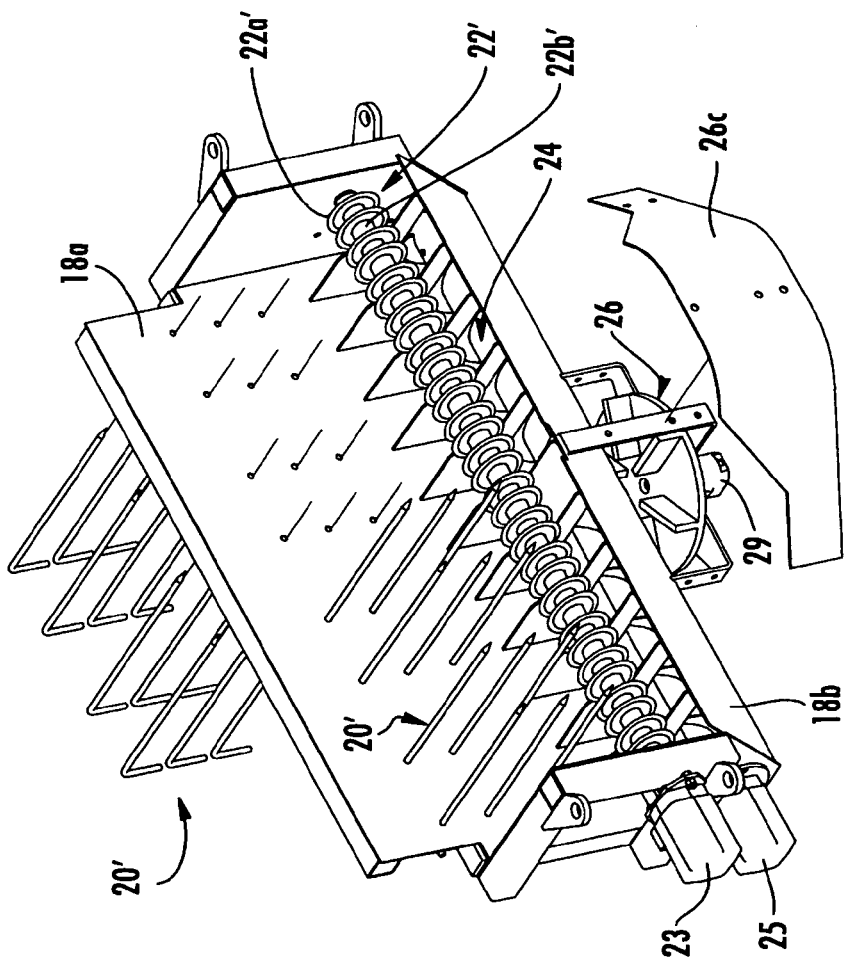
FIG. 9 is an opposite perspective view of the hopper assembly of FIG. 8.
Figure 10:
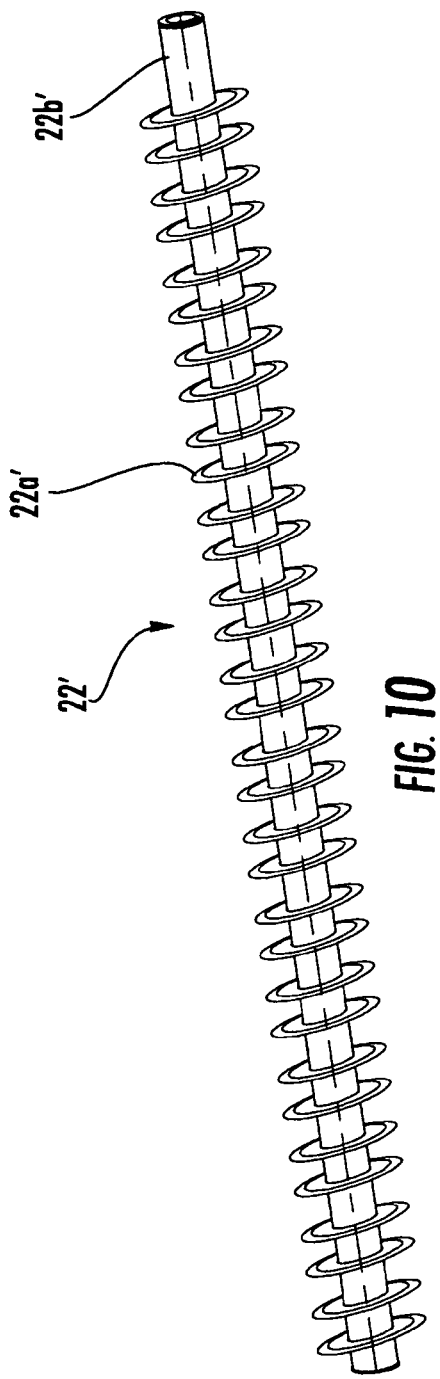
FIG. 10 is a perspective view of the cutting blades of the hopper assembly of FIGS. 8 and 9.
Figure 11:
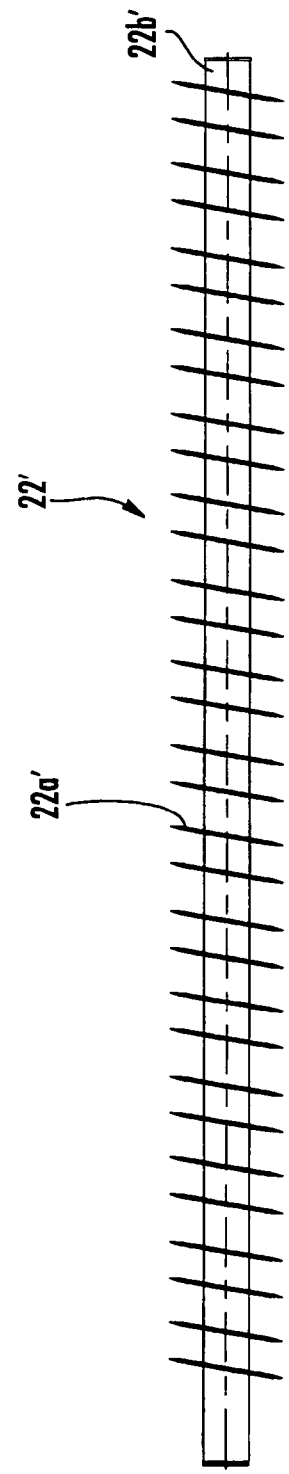
FIG. 11 is a plan view of the cutting blades of FIG. 10.

As shown in FIGS. 8 and 9, a hopper assembly 18' of the present invention may include rotatable blades 22' positioned along the hopper assembly for cutting the bags as they are pierced and suspended by the bag holders or spikes 20'. The blades 22' may comprise a plurality of discs 22*a'* spaced apart along an elongated drive shaft 22*b'*, which is rotatably mounted at the hopper assembly 18' and which may be rotatably driven via a hydraulic motor 23 or other drive mechanism or device or the like. The blades or discs 22*a'* (FIGS. 8–11) may have a sharpened circumferential edge to cut into the lower portion of the bags as the bags are suspended by the bag holders and as the discs 22*a'* are rotated via rotational driving of the elongated drive shaft 22*b'* by the motor 23. The cutting discs 22*a'* may be spaced apart along the drive shaft 22*b'* a desired or appropriate amount so as to cut into the bags, preferably at multiple locations along each bag, to cause the bags to dispense their contents into the dispensing bin as the bags are supported by the bag holders 20'.

As can be seen in FIGS. 8 and 9, the bag holders 20' of hopper assembly 18' may comprise a plurality of pointed rods or spikes and may be arranged in rows along the hopper assembly to pierce and hold/support the bags at multiple locations to enhance holding of the bags while the bags are cut open by the cutting device and their contents are dispensed into the dispensing chamber or bin 18*b* of the hopper assembly 18'. The hopper assembly 18' may otherwise be substantially similar to hopper assembly 18, discussed above, such that a detailed description of the hopper assembly will not be repeated herein. The substantially common components are referenced in FIGS. 8 and 9 with the same reference numbers as used in connection with hopper assembly 18 of FIGS. 1–7. Optionally, a cover plate 26*c* may be positioned at least partially around a forward portion of spinner disc 26 to limit or substantially preclude salt or material from being spread or broadcast or thrown forwardly by the spinner disc during operation of the spreading device.

Salt spreader assembly 10 may further include a limit switch or level switch 32 (FIG. 4), which may be operable to detect the level of salt or other material within the dispensing bin of the hopper assembly. When the level of material within dispensing bin 18*b* reaches a predetermined low level or threshold level, level switch 32 may provide or generate a signal indicative of such a low level. A control or solenoid valve or the like at power source or engine 30 and pump may then actuate the motor or motors of the bulkhead assembly 16 and/or the conveyors 28 in response to the signal to move the bulkhead 16*a* rearward until the next row of bags 14 are held and cut or opened and emptied into the hopper dispensing bin 18*b*. When the dispensing bin 18*b* is again filled to a desired level, the bulkhead 16*a* may be stopped to prevent overfilling of dispensing bin 18. The limit switch 32 may comprise on optical sensor or the like or may comprise a mechanical switch or triggering device. The switch device may thus provide an electrical signal to a control or solenoid valve at the motor 17*c* of bulkhead assembly 16 or at power source 30 or the like, or may provide a mechanical actuation or triggering of the movement of the bulkhead 16*a* or conveyor belts 28, without affecting the scope of the present invention.

The moving device or bulkhead may be operable to move the bags toward the hopper assembly a predetermined distance or amount (such as a distance representative of the width or depth of a bag of material so that a row of bags may be moved into the bag holding portion) in response to the triggering signal from the level switch, or may be operable to move the bags until a predetermined resistance is met (such as by moving the bags to the hopper assembly until the bags are pressed against the back of the holding portion and such that further movement is limited or resisted) in response to the triggering signal, or may be operable to move the bags the desired or appropriate amount in response to other settings or criteria, without affecting the scope of the present invention. The distance the bags are moved or the amount of resistance required to stop the moving device (or other limitation or criteria) may be selected depending on the types of bags and/or material that are implemented with the material dispensing device.

It is further envisioned that the cutting or opening device or devices 22 may be powered and operable to selectively cut or otherwise open the bags at the hopper in response to a triggering or actuating signal. The limit switch may then detect a low level in the dispensing bin and actuate the cutting device 22 to open the bags which may be supported at the hopper assembly by bag holders 20. The cutting device 22, when actuated, may engage the bottoms of the bags (such as via raising upward and into engagement with the bottoms of the bags) and may open the bags, thereby allowing the material in the bags to be emptied into the dispensing bin. In such an embodiment, the bulkhead may be biased or spring-loaded to push the bags of material rearward such that filled bags are moved to and positioned on the bag holders or spears after the previous row of bags are cut and emptied.

The bulkhead may be movable toward the hopper assembly via any drive means or means for moving the bulkhead and material toward the hopper assembly. For example, in one embodiment of the material spreading assembly of the present invention, the bulkhead may be powered or driven along the receiving portion or magazine, while the conveyor belts are freely movable about the rollers. Optionally, the conveyors may be driven via one or more motors or the like to move the material or bags toward the hopper. It is envisioned that the bulkhead may be attached to the conveyors to move with the driven conveyors, or may be biased or spring-loaded and thus biased toward the rear of the magazine and toward the hopper. The biased bulkhead may be pushed or moved or driven toward the front of the magazine (such as via driving or manually moving the bulkhead or driving the conveyors in that direction or via other driving or moving means) before or during loading of the magazine, and then may be biased toward the hopper to push or move the material or bags rearward as desired. Other means for moving the material or bags rearward toward and into the hopper assembly may be implemented, without affecting the scope of the present invention.

In the illustrated embodiment, the power source or system comprises a gas engine which powers a hydraulic pump, which in turn drives hydraulic motors via pressurized hydraulic fluid. The bulkhead drive system may thus comprise a hydraulic motor which drives the driven sprocket that engages the roller chain to move the bulkhead along the truck bed. The conveyor may include two or more rubber conveyor belts which may be chain driven or may be driven along with the bulkhead as the bulkhead is moved along the truck bed. The auger assembly and the spinner disc may also be rotatably driven by respective hydraulic motors that are powered by the power source. Each of the motors may be selectively actuated, such as via actuation of a respective control or solenoid valve or the like to provide pressurized fluid to the motor or motors. The controls may be at the power source or may be positioned elsewhere on the vehicle, such as in the cab of the vehicle, without affecting the scope of the present invention. Optionally, however, the bulkhead, conveyor, auger and/or spinner disc may be powered or driven via any other power source or drive means, such as via electrical motors or any other power-means, without affecting the scope of the present invention.

Figure 12:
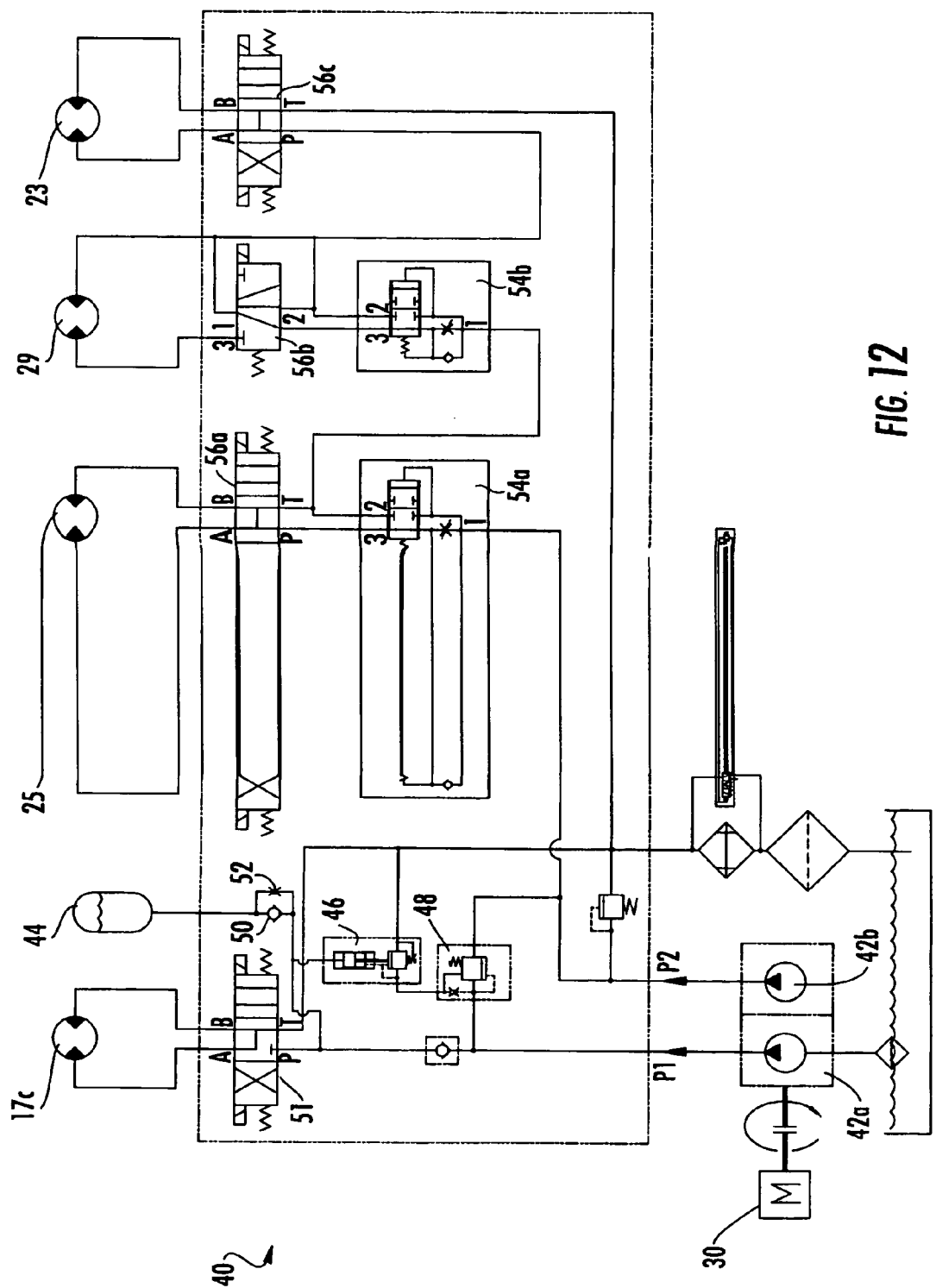
FIG. 12 is a hydraulic schematic of a hydraulic system suitable for controlling the spreading device of the present invention.

Optionally, and with reference to FIG. 12, a hydraulic system 40 is operable to move the bulkhead or push plate 16 via hydraulic motor 17c, and to operate the hydraulic motor 25 for the auger 24 and the hydraulic motor 29 for the spinner disc 26. Optionally, such as for the hopper assembly 18' of FIGS. 8 and 9, the hydraulic system 40 may also operate the rotatable cutting device 22' via hydraulic motor 23. Hydraulic system 40 includes two pumps 42a, 42b, with one pump 42a dedicated to the push plate and the other pump 42b dedicated to the hydraulic motors 25, 29 and 23 for the auger 24, spinner disc 26 and bag cutter 22', respectively. The pumps 42a, 42b may be powered or driven by a gas-powered engine 30 or the like. When the system is started, the push plate pump 42a may begin charging up an accumulator 44, which accumulates the pumped hydraulic fluid or oil until a desired or selected pressure within the accumulator is reached. When the accumulator pressure reaches the preselected or predetermined level, such as, for example, about 1000 p.s.i., an unloading valve 46 may shift, thus causing a regulating valve 48 to discharge or dump the hydraulic fluid or oil to the rest of the circuit or system or lines at a low pressure. A check valve 50 limits or substantially precludes the accumulator 44 from discharging the accumulated fluid back through the rest of the circuit. The fluid passing through regulating valve 48 joins with the fluid pumped by the other pump 42b to run the hydraulic motors 25, 29, 23 for the auger 24, spinner disc 26 and bag cutter 22', respectively.

The motor 17c may drive or move the push plate when a directional valve 51 is actuated to supply pressurized fluid to and through the hydraulic motor 17c. As the accumulator fluid or oil is consumed by the motor 17c of the moving push plate 16a, the pressure drops in the accumulator 44 (as the fluid is bled from the accumulator via a reduced diameter orifice 52 (such as on orifice having, for example, a 0.06 inch diameter or thereabouts). When the fluid pressure in the accumulator 44 drops a particular amount, such as when it reaches about 80% of the set pressure (such as when it reaches about 800 p.s.i. if the set pressure is about 1000 p.s.i.), the unloading valve 46 may close, thus causing regulating valve 48 to close and the accumulator 44 to recharge as fluid is pumped by pump 42a. During the recharge time, the fluid flowing into the accumulator is not available to the rest of the circuit.

The operation of the accumulator 44, unloading valve 46 and regulating valve 48 results in the pressure remaining substantially constant at the hydraulic motor 17c (such as about 800 to 1000 p.s.i. pressure at the push plate drive motor), such that the push plate 16a exerts a substantially continuous force on the salt bags. The oil from the second pump 42b plus the oil dumped from the regulating valve 48 may flow to pressure compensated flow controls 54a, 54b for the motor 25 of the auger 24, and then to the motor 29 of the spinner disc 26, and finally to the motor 23 of the bag cutter 22'. The hydraulic system 40 may include a mechanical clutch or the like (not shown) at the engine output shaft to unload the pump during startup of the engine, or may include a pump unloading valve or the like as discussed below. The system 40 further includes control valves 56a, 56b, 56c for selectively or automatically actuating or deactuating the motors 25, 29, 23, respectively.

Figure 13:
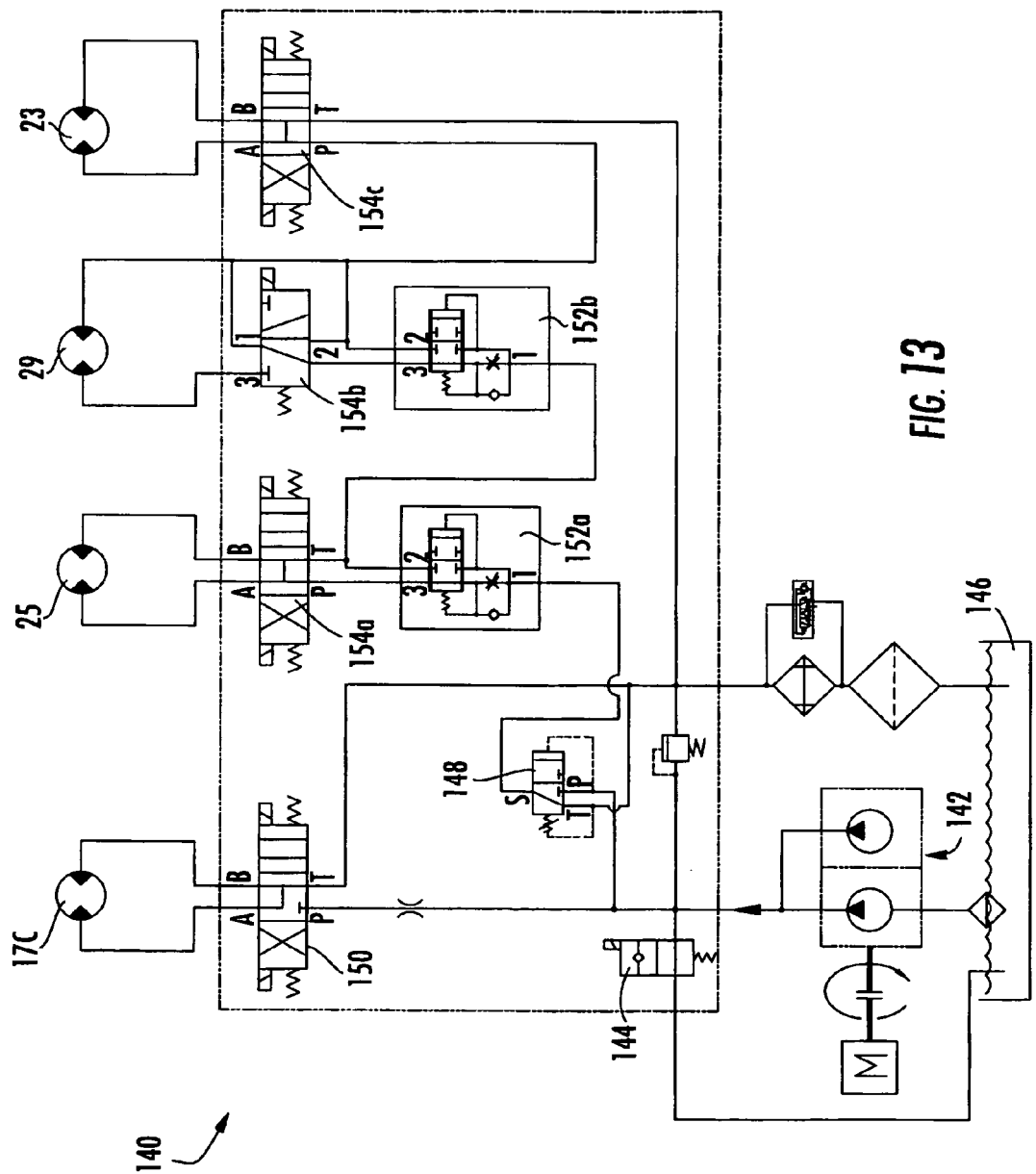
FIG. 13 is another hydraulic schematic of a hydraulic system suitable for controlling the spreading device of the present invention.

Optionally, and with reference to FIG. 13, a hydraulic system 140 is operable to move the bulkhead or push plate 16 via hydraulic motor 17c, and to operate the hydraulic motor 25 for the auger 24 and the hydraulic motor 29 for the spinner disc 26. Optionally, such as for the hopper assembly 18' of FIGS. 8 and 9, the hydraulic system 140 may also operate the rotatable cutting device 22' via hydraulic motor 23. Hydraulic system 140 includes a pump 142 (although shown as two pumps teed together, this may be a single pump, without affecting the scope of the present invention) to operate the motors 17c, 25, 29 and 23 for the push plate 16a, auger 24, spinner disc 26 and bag cutter 22', respectively. In the illustrated embodiment, hydraulic system 140 includes a pump unloading valve 144 which may be used for cold starting and may allow pump flow to circulate directly back to the reservoir or tank 146 to minimize the load on the engine when starting. After the engine is started, the pump unloading valve 144 may be closed.

Hydraulic system 140 also includes a sequence valve 148, which works similar to a relief valve. When the fluid pressure at the valve 148 reaches the valve's setting (such as, for example, about 1500 p.s.i.), the valve 148 may open and allow the fluid to dump at the valve's setting to the remainder of the circuit. As a result, the push plate valve 150 may operate at substantially a constant pressure (such as about 1500 p.s.i.) to keep a substantially constant force on the bags via the push plate. The fluid that passes through or dumps over the sequence valve 148 flows to pressure compensated flow controls 152a, 152b for the motor 25 of the auger 24, and then to the motor 29 of the spinner disc 26, and finally to the motor 23 of the bag cutter 22'.

The sequence valve 148 thus opens to allow fluid to flow to the motors 25, 29, 23 when the pressure in the fluid line to the push plate motor 17c reaches a desired or selected pressure. The sequence valve 148 then opens to relieve the pressure such that the pressure remains substantially constant in the line to the push plate motor 17c. The push plate motor 17c thus is operable at a substantially constant pressure and, thus, causes push plate 16a to exert a substantially constant force at the bags of material. The system 140 further includes control valves 154a, 154b, 154c for selectively or automatically actuating or deactuating the motors 25, 29, 23, respectively.

Both hydraulic systems 40, 140, discussed above, may provide a substantially constant pressure or force at the bulkhead or push plate to push against and move the bags in the receiving portion of the spreading device. The hydraulic system 40 may provide an efficient system, since the fluid or oil from the push plate pump is unloaded to the remainder of the circuit under essentially no pressure, but may be more expensive to implement. Alternately, the hydraulic system 140 may operate with a single pump, and includes the sequence valve, which may substantially constantly dump the oil or fluid at the sequence valve setting, thereby generating heat and inefficiencies. Other hydraulic or electric systems may be implemented to provide similar control and operation of the motors, without affecting the scope of the present invention.

Although shown and described as being used for emptying and spreading salt from salt bags, the spreader assembly of the present invention may also or otherwise be used to spread other material, which may or may not be provided in bags, such as sand, gravel, dirt or the like. For example, during summer months, the spreader assembly of the present invention may be used to spread other bagged products such as fertilizer, grass seed, topsoil, rocks, gravel, sand and/or the like. Optionally, it is envisioned that the spreading device may carry and spread bulk material, such as dirt, sand, gravel, topsoil/loam, mulch, or any other type of material which may be loaded in bulk into the bed of the truck or into the receiving portion of the spreading assembly, and pushed rearward into the hopper assembly, where it may be discharged or spread over the desired area. The conveyor belt system and/or discharge area may be slightly modified to enhance the performance of the spreading device in such an application. It is further envisioned that different or "optional" gate/hopper configurations may be offered to service these various other types of applications.

The salt spreader of the present invention thus provides a self-contained, freestanding device that may be supported at a pickup truck bed level when not in use. When it is desired to install or attach the salt spreader assembly, the operator may remove the tailgate from a truck and back the truck under the spreader assembly (which may be suspended via any mounting frame or support to provide clearance beneath the salt spreader assembly for the truck). Once in position in the truck bed, the spreader assembly may be mechanically fastened to the vehicle to prevent the device from shifting during use.

When the spreader assembly is secured in place on the vehicle, the operator may open the hopper gate (as shown in FIG. 1) to gain access to the bag receiving and storage area and may actuate or engage the conveyor motors or bulkhead motors to move or slowly move or creep the conveyor belts and/or bulkhead toward the front of the vehicle. As the conveyor belts and bulkhead move, the operator may place salt bags, first against the moving bulkhead and then against each other (or in any other order), in multiple rows until the bulkhead reaches it's full forward position. At this point, the forward movement of the conveyor and/or bulkhead may be stopped. The salt bag storage magazine may then be full or partially full and the hopper gate may be closed. After the gate is closed, the operator optionally may cut and open additional bags and pour additional salt or material into the hopper bin if additional salt or other material is desired.

When the operator is ready to begin spreading the salt or other material, the operator may actuate or engage the hopper auger (such as via actuating an appropriate control or solenoid valve), which conveys the material in the dispensing bin of the hopper assembly to the hopper discharge hole. The material may then drop or discharge onto the broadcaster or spinner disc (which also may be actuated via the operator actuating an appropriate control or solenoid valve or may be actuated in response to the actuation of the auger), which then broadcasts the material across the pavement surface or other surface or area.

When the level of material in the hopper diminishes to a predetermined amount (as may be monitored by a load level switch or optical sensor or the like), the switch or other actuator or the like may engage or actuate or trigger the bulkhead or push plate and/or the bag conveyor, which in turn functions to move or push the stacked bags back towards the hopper area. As the bags are moved toward the hopper and just as the bags are about to fall into the hopper, the bag spears or spikes pierce the bags in the rearward most row, such as around midway up the bags, thereby holding or suspending the bags above the hopper and keeping the bags from dropping into the hopper. As the bags are moved further back onto the spikes or bag holders, the bag bottoms may be slit or cut or torn or otherwise opened with knives or blades or the like, allowing the material in the suspended bags to drop into the hopper bin. When the hopper bin reaches a "full" level, the load level switch or the like may turn the bulkhead and/or bag conveyor off to stop rearward movement of the bags in the truck bed. This process may be automatically repeated until all the bags in the truck bed have been pushed across the slitting knives or blades or the like, the material dropped and spread, and the empty bags collected on the bag holders or spears. When the bag magazine or receiving portion is empty, the operator can swing the hopper open and easily remove the empty bags from the bag spears.

In the illustrated embodiment, the salt spreader assembly allows for up to approximately forty-four (44) fifty (50) pound-bags of salt to be stored in the magazine or receiving portion, and the contents of an additional sixteen bags or thereabouts may be poured loose in the hopper bin. This translates to approximately 33 cubic feet or 2200 lbs. of bagged salt and approximately 12 cubic feet or 800 lbs. of loose salt. Therefore, the spreader may hold approximately 45 cubic feet or approximately 3000 lbs. of salt. The salt spreader of the present invention thus has a 1.66 cubic yard capacity, which is in the range of many conventional vee box spreaders. Although shown and described as holding, cutting and emptying bags of material, clearly the term "bags" is meant to encompass paper bags, plastic bags, and other containers or bins, such as boxes and cartons and the like, which are used to hold or contain salt or other material which may be desired to be spread over a targeted area by the spreader assembly of the present invention.

The present invention thus provides a material spreading assembly for a pickup truck which provides a capacity that is approximately 4½ times greater than conventional tailgate spreaders, thereby reducing the amount of down time required to refill the hopper. The spreader magazine may be loaded from the ground level, and avoids the need to climb up into the truck bed, thus reducing potential injury due to slips or falls. The spreader design of the present invention also allows contractors without storage and loading equipment to handle and spread bagged salt with optimum efficiency. The empty bags are collected automatically by the bag holders or spikes at the hopper assembly and held securely until disposed of after the job is completed. Also, the present invention provides a low profile spreader assembly, which gives the operator of the vehicle an unobstructed rearward field of view during use of the spreader assembly. The spreader assembly may be easily installed and removed from the truck bed without the need of lifting equipment. The spreader may be left in the vehicle when not in use (empty), yet the vehicle may still provide carrying capacity of miscellaneous cargo.

Changes and modifications to the specifically described embodiments may be carried out without departing from the principles of the present invention, which is intended to be limited only by the scope of the appended claims, as interpreted according to the principles of patent law.

The invention claimed is:

1. A material spreading device for spreading material over a targeted area, said material spreading device being adaptable for use on a vehicle and comprising:
   a receiving portion for receiving a plurality of bags of material;
   a hopper assembly having a bag holding portion and a material dispensing bin, said bag holding portion being configured to receive at least some of said bags and to retain said at least some of said bags at or near said material dispensing bin, said hopper assembly including at least one bag opening device for opening said at least some of said bags such that material within said bags is deposited into said material dispensing bin, said material dispensing bin being operable to dispense or broadcast said material over the targeted area; and a material moving device operable to move said bags of material along said receiving portion and toward said hopper assembly.

2. The material spreading device of claim 1, wherein said receiving portion is configured to fit within a pickup truck bed, said hopper assembly being mountable at a rear end of the pickup truck bed.

3. The material spreading device of claim 2, wherein said hopper assembly is pivotally mounted at the rear end of said receiving portion or of the pickup truck bed, said hopper assembly being pivotable to an open position or being removable to facilitate loading of said receiving portion by a person on the ground outside of the pickup truck bed.

4. The material spreading device of claim 1, wherein said material moving device comprises a movable bulkhead which is movable to push said bags of material toward said hopper assembly.

5. The material spreading device of claim 4, wherein said movable bulkhead is movable via a rotatably driven sprocket engaging a track extending generally along said receiving portion.

6. The material spreading device of claim 4, wherein said material moving device includes a conveyor along a lower portion of said receiving portion for conveying said bags of material toward said hopper assembly.

7. The material spreading device of claim 1, wherein said material moving device is operable in response to a limit sensor detecting a threshold low level of material in said dispensing bin.

8. The material spreading device of claim 1, wherein said material moving device includes a conveyor along a lower portion of said receiving portion for conveying said bags of material toward said hopper assembly.

9. The material spreading device of claim 1, wherein said receiving portion is configured to receive bulk material, said material moving device being operable to move said bulk material toward said hopper.

10. The material spreading device of claim 1, wherein said bag holding portion of said hopper assembly includes a plurality of forwardly extending members for piercing said at least some of said bags and retaining said at least some of said bags at or near said material dispensing bin.

11. The material spreading device of claim 1, wherein said hopper assembly includes a spinner disc which is rotatably drivable to broadcast material dispensed from said material dispensing bin.

12. The material spreading device of claim 1, wherein said hopper assembly comprises a material dispensing device operable to move material within said material dispensing bin toward a discharge opening in said material dispensing bin.

13. The material spreading device of claim 1, wherein said at least one bag opening device comprises a plurality of elements that engage and cut or tear the bags at said bag holding portion.

14. The material spreading device of claim 13, wherein said plurality of elements comprise a plurality of movable cutting elements that are moved to cut or tear the bags at said bag holding portion.

15. The material spreading device of claim 1, wherein said moving device and said dispensing bin are operable via respective hydraulic motors.

16. A method for spreading material over a targeted area with a vehicle, said method comprising:

providing a material spreading device adapted for use on a vehicle, said material spreading device comprising a hopper assembly having a bag holding portion and a material dispensing bin, said bag holding portion being configured to receive bags of material and to retain said bags at or near said material dispensing bin, said hopper assembly being mounted at a rear end of a pickup truck bed;

loading bags of material into a receiving portion, said receiving portion being positioned at least partially within the pickup truck bed;

moving said bags of material along said receiving portion and toward said bag holding portion via a moving device operable to move said bags of material until at least some of said bags are at said bag holding portion;

holding said at least some of said bags at said bag holding portion;

opening said bags held at said bag holding portion, such that material within said held bags is deposited into said material dispensing bin; and dispensing said material in said material dispensing bin over the targeted area.

17. The method of claim 16, wherein moving said bags of material comprises moving said bags of material via a movable bulkhead which is movable to push said bags of material toward said hopper assembly.

18. The method of claim 17, wherein said movable bulkhead is movable via a rotatably driven sprocket engaging a track extending generally along said receiving portion.

19. The method of claim 17, wherein said moving device includes a conveyor along a lower portion of said receiving portion for conveying said bags of material toward said hopper assembly.

20. The method of claim 16, wherein said moving device is operable in response to a limit sensor detecting a threshold low level of material in said dispensing bin.

21. The method of claim 16, wherein holding said at least some of said bags includes piercing said at least some of said bags with a plurality of forwardly extending members at said bag holding portion of said hopper assembly.

22. The method of claim 16, wherein opening said bags held at said bag holding portion comprises cutting or tearing said bags with a plurality of cutting elements.

23. The method of claim 22 including moving said cutting elements to cut or tear said bags held at said bag holding portion.

24. A material spreading device for spreading material over a targeted area, said material spreading device being adaptable for use on a vehicle and comprising:

a receiving portion for receiving material, said receiving portion being configured to fit within a pickup truck bed;

a hopper assembly having a material dispensing bin, said material dispensing bin being operable to dispense or broadcast said material over the targeted area, said hopper assembly being mountable at a rear end of the pickup truck bed; and a material moving device operable to move said material along said receiving portion and toward said hopper assembly, said material moving device comprising a movable bulkhead which is movable to push said material toward said hopper assembly.

25. The material spreading device of claim 24, wherein said hopper assembly is pivotally mounted at the rear end of said receiving portion or of the pickup truck bed, said hopper assembly being pivotable to an open position or being removable to facilitate loading of said receiving portion by a person on the ground outside of the pickup truck bed.

26. The material spreading device of claim 24, wherein said movable bulkhead is movable via a rotatably driven sprocket engaging a track extending generally along said receiving portion.

27. The material spreading device of claim 24, wherein said material moving device includes a conveyor along a lower portion of said receiving portion for conveying said material toward said hopper assembly.

28. The material spreading device of claim 27, wherein said movable bulkhead and said conveyor move substantially in unison along said receiving portion.

29. The material spreading device of claim 24, wherein said material moving device is operable in response to a limit sensor detecting a threshold low level of material in said dispensing bin.

30. The material spreading device of claim 24, wherein said receiving portion receives a plurality of bags of material and said hopper assembly includes a bag holding portion, said bag holding portion being configured to receive at least some of said bags and to retain said at least some of said bags at or near said material dispensing bin, said hopper assembly including at least one opening device for opening said at least some of said bags such that material within said bags is deposited into said material dispensing bin.

31. The material spreading device of claim 30, wherein said bag holding portion of said hopper assembly includes a plurality of forwardly extending members for piercing said at least some of said bags and retaining said at least some of said bags at or near said material dispensing bin.

32. The material spreading device of claim 24, wherein said hopper assembly includes a spinner disc which is rotatably drivable to broadcast material dispensed from said material dispensing bin.

33. The material spreading device of claim 24, wherein said hopper assembly comprises a material dispensing device operable to move material within said material dispensing bin toward a discharge opening in said material dispensing bin.

34. A material spreading device for spreading material over a targeted area, said material spreading device being adaptable for use on a vehicle and comprising:

a receiving portion for receiving a plurality of bags of material, said receiving portion is configured to fit within a pickup truck bed;

a hopper assembly having a bag holding portion and a material dispensing bin, said hopper assembly being mountable at a rear end of the pickup truck bed, said bag holding portion including a plurality of forwardly extending members for piercing at least some of said bags and retaining said at least some of said bags at or near said material dispensing bin, said hopper assembly including at least one bag opening device for opening said bags such that material within said bags is deposited into said material dispensing bin, said material dispensing bin being operable to dispense or broadcast said material over the targeted area; and a material moving device operable to move said bags of material along said receiving portion and toward said hopper assembly until the rearwardmost bags are pierced by said forwardly extending members of said bag holding portion.

35. The material spreading device of claim 34, wherein said hopper assembly is pivotally mounted at the rear end of said receiving portion or of the pickup truck bed, said hopper assembly being pivotable to an open position or being removable to facilitate loading of said receiving portion by a person on the ground outside of the pickup truck bed.

36. The material spreading device of claim 34, wherein said material moving device comprises a movable bulkhead which is movable to push said bags of material toward said hopper assembly.

37. The material spreading device of claim 36, wherein said movable bulkhead is movable via a rotatably driven sprocket engaging a track extending generally along said receiving portion.

38. The material spreading device of claim 36, wherein said material moving device includes a conveyor along a lower portion of said receiving portion for conveying said bags of material toward said hopper assembly.

39. The material spreading device of claim 34, wherein said material moving device is operable in response to a limit sensor detecting a threshold low level of material in said dispensing bin.

40. The material spreading device of claim 34, wherein said material moving device includes a conveyor along a lower portion of said receiving portion for conveying said bags of material toward said hopper assembly.

41. The material spreading device of claim 34, wherein said receiving portion is configured to receive bulk material, said material moving device being operable to move said bulk material toward said hopper.

42. The material spreading device of claim 34, wherein said hopper assembly includes a spinner disc which is rotatably drivable to broadcast material dispensed from said material dispensing bin.

43. The material spreading device of claim 34, wherein said hopper assembly comprises a material dispensing device operable to move material within said material dispensing bin toward a discharge opening in said material dispensing bin.

44. The material spreading device of claim 34, wherein said at least one opening device comprises a plurality of elements that engage and cut or tear the bags at said bag holding portion.

45. The material spreading device of claim 44, wherein said plurality of elements comprise a plurality of movable cutting elements that are moved to cut or tear the bags at said bag holding portion.

\* \* \* \* \*